US006691448B2

United States Patent
Jones

(10) Patent No.: US 6,691,448 B2
(45) Date of Patent: Feb. 17, 2004

(54) FISH HOOK PROTECTOR GUARD

(76) Inventor: George D Jones, 9210 5th St., Lanham, MD (US) 20706

( * ) Notice: Subject to any disclaimer, the term of this patent is extended or adjusted under 35 U.S.C. 154(b) by 157 days.

(21) Appl. No.: 09/922,788

(22) Filed: Aug. 7, 2001

(65) Prior Publication Data

US 2002/0124454 A1 Sep. 12, 2002

Related U.S. Application Data

(60) Provisional application No. 60/223,992, filed on Aug. 9, 2000.

(51) Int. Cl.$^7$ .............................................. A01K 85/00
(52) U.S. Cl. ........................... 43/42.4; 43/43.2; 43/25.2
(58) Field of Search ................................. 43/42.4, 43.2, 43/43.4, 25.2; 220/780

(56) References Cited

U.S. PATENT DOCUMENTS

| | | | | | |
|---|---|---|---|---|---|
| 933,818 | A | * | 9/1909 | Beatty | 43/41 |
| 1,634,030 | A | * | 6/1927 | Korkames | 43/57.3 |
| 2,691,840 | A | * | 10/1954 | Smith | 43/25.2 |
| 2,767,502 | A | * | 10/1956 | Reynolds | 43/25.2 |
| 2,775,060 | A | * | 12/1956 | Barker | 43/57.1 |
| 2,787,858 | A | * | 4/1957 | Best | 43/43.15 |
| 3,141,258 | A | * | 7/1964 | Mayer | 43/57.1 |
| 3,170,588 | A | * | 2/1965 | Lyon | 220/780 |
| 3,470,930 | A | * | 10/1969 | Jurczenia | 220/780 |
| 4,452,003 | A | * | 6/1984 | Deutsch et al. | 43/25.2 |
| 4,597,216 | A | * | 7/1986 | Bjorshol | 43/43.2 |
| 4,667,433 | A | * | 5/1987 | Thompson, Jr. | 43/25.2 |
| 4,841,664 | A | * | 6/1989 | Baldwin | 43/41 |
| 4,879,832 | A | * | 11/1989 | Nelson | 43/25.2 |
| 4,884,357 | A | * | 12/1989 | Clifford | 43/25.2 |
| 5,123,199 | A | * | 6/1992 | Lysohir et al. | 43/57.1 |
| 5,220,742 | A | * | 6/1993 | Lewis | 43/25.2 |
| 5,430,969 | A | * | 7/1995 | Taylor et al. | 43/25.2 |
| 5,452,538 | A | * | 9/1995 | Trefiak | 43/42.4 |
| 5,535,541 | A | * | 7/1996 | Fisher | 43/57.1 |
| 5,625,977 | A | * | 5/1997 | Medford | 43/57.1 |
| 5,669,550 | A | * | 9/1997 | Klemme et al. | 229/4.5 |
| 5,934,464 | A | * | 8/1999 | Vargo et al. | 206/315.11 |
| 5,943,810 | A | * | 8/1999 | Bennett et al. | 43/41 |
| 5,992,082 | A | * | 11/1999 | Barefoot | 43/25.2 |
| 6,023,876 | A | * | 2/2000 | Haddad et al. | 43/25.2 |

FOREIGN PATENT DOCUMENTS

JP      2001204337 A   *  7/2001   .......... A01K/97/06

* cited by examiner

Primary Examiner—Peter M. Poon
Assistant Examiner—Joan M. Olszewski

(57) ABSTRACT

A shaped fish hook guard designed to enclose various sized fish hooks or gangs of fish hooks pivotally suspended from a lure. The fishook guard is made of hard plastic that comprises a slotted casing through which the shank of a fish hook can be slid and a snap on cover extending partially over an open end of a pair of opposite coincident slots. Where the lure is not used, a fishing line passes through a slot to be attached to the shank of a single pronged hook.

4 Claims, 1 Drawing Sheet

FISH HOOK PROTECTOR GUARD

This application supersedes provisional application 60/223,992 filed on Aug. 9, 2000 and under Title 35, United States Code, 119(e) claims the benefit thereof.

This invention pertains to a simple but unique design for a covering up fish hooks when not in use.

BACKGROUND OF THE INVENTION

The art teaches a number of products developed to prevent fish hooks from entangling one another or doing injury to the fisherman. A number of these devices use sheaths having narrow slots for confining the fish hooks when not in use. At least one of the producrs uses a foam type material for embedding the hooks until ready for use while another device makes use of gravitational force to extricate a hook from its shield when a fishing operation is to start.

U.S. Pat. No. 2,482,881 is a guard for fish hooks especially of the three pronged type. It is said that the guard may be safely and easily carried out and conveniently stored when not in use. It is easy to construct and the cost of manufacture is low. FIG. 1 shows a conventional lure having two three pronged hooks where the guard is applied to the hooks. The guards are made of hard rubber, which is slightly flexible. The guards have a central opening adapted to receive the stem of the hook. A slot having a V-shaped entrance leads to an opening. The slot is wide enough to permit entrance of the stem located in the opening when the guard is used as a protector. There are also a pair of slits that extend from the periphery of the guard to the opening. Both slits have a V-shaped entrance only at the bottom surface to permit an easy adjustment and seating of the prongs within the slits and slot.

U.S. Pat. No. 2,616,209 is another shield for fishhooks that affords protection against entangling. The design is similar to '881 above, except that instead of using flexible rubber for the body, plastic or metal is used and for enclosing the hooks pockets are substituted for slits. The loops of the hooks are inserted between flared upper ends and shifted endwise into the pockets until the loops and points are confined between the pocket walls. Resilient indented portions of the pockets will grip portions of the loops and hold them in the pockets to detachably secure the shield on the gang of hooks. The ribs in the central portion of the body also help engage the portions of the shanks of the hooks which are usually soldered.

U.S. Pat. No. 2,775,060 shows a fish hook guard on a gang type fish hook that comprises a pear shaped resilient rubber body with reduced area section at one end merging into a reduced neck. The neck and body include a plurality of circumferentially radially designed slots. The slots are so sized as to accommodate the barbed hooks which are frictionally engaged with the sides of the slots. The frictional force is set so as not to prevent ready removal of the hooks.

U.S. Pat. No. 4,121,368 is described as point pads for treble point fishhooks. The bottom of the pad is made of foam plastic into which the fishhook can be readily embedded for protection of the angler as well as the hook when not in use. The top of the pad is made of harder material. The pad is shaped as an equilateral triangle with a central-through aperture on a through-slit extending from the aperture to one side of the pad. A notch extends inwardly and communicates with the slot. The pads are easily and cheaply produced by a one-step die casting operation.

U.S. Pat. No. 4,614,054 is a fish hook protective cover that includes a base made of flexible plastic that supports a plurality of pockets that permits each pocket to pivot downwardly and away from the others to expose one barbed hook at a time. The radially inner edges of the pockets lie spaced from each other to define an open region that extends downwardly to the web for receiving the shank portion of a plural fishhook therein. After a pocket has been pivoted downwardly to expose the hook, buttons serve to retain the pocket in its open position, but the buttons can be separated to permit removal or insertion of the hook.

U.S. Pat. No. 4,833,814 is a fish hook sheath, wherein the novelty is the provision of a finger guard which isolates the aperture region from that grasped by a user's fingers. The guard has one or more holes for stringing sheaths together, and multiple sheaths can be injection molded.

U.S. Pat. No. 4,926,579 has a different concept than the heretofore mentioned devices. It is a sng proof fishing line that automatically shields the barb of a hook when removed from the water and exposes the hook when submerged. The device includes a J shaped hook with a barb at one end and an eyelet at the other end. A shield is pivotally connected to the hook shank below the eyelet to cover the barb of the line when not submerged. When the hook sinks, submersion of the shield is limited to effectively keep the shield from the sinking barb. On lifting the line from the water, the weight of the shield causes it to be lowered on the barb.

U.S. Pat. No. 6,082,040 is a hook guard made of resilient material wherein the leg and arm of the guard are shaped to have a different angle than that between the prongs of a hook. Because of the resilience of the body, the leg and arm are capable of being shaped into an angle about the same as that of the angle between the prongs so that the prongs can be readily inserted into the cavity and thereafter frictionally retained when the leg and arm return to their normal position.

The guards and sheaths of the prior art, while serving to reduce entanglement of hooks and injury to the fisherman, are cumbersome to use for the most part. In most of the guards the barbed hooks must be inserted into a narrow pocket or slit where there is still a possibility of getting the finger snagged either in insertion or removal. (Note the finger guard of '814). Furthermore, while it is stated that the cost of manufacture is low, there is still the necessity of forming special molds and dies. especially when there are a number of shaped slots and slits as well as ribs and buttons. The apparatus that uses foam pads is much simpler, but it is apparent that after a number of insertions and removal of the hooks from these pads, the plastic foam would require replacement. The disadvantage of the device '579 is lack of flexibility in the type of hook used. Whereas most of the other devices one can use multiple pronged hook as well as a single hook or a gang of hooks, with this apparatus, you are more or less confined to a single hook. Furthermore the shield does not appear to be in frictional engagement with the hook, so there is a possibility that when the lure is lifted out of the water, the hook could slip out of the shield.

It is therefore an object of this invention to provide a simple, inexpensive device that does not require special type molds or dies to manufacture.

It is also an object of this invention to provide a device wherein a single hook, a three pronged hook or a gang of hooks can be used.

It is further an object of this invention to provide a simple cover in which the barbed hook can be inserted or removed with ease. and with little likelihood of injury to the users fingers.

It is finally an object of this invention to provide a fish guard that does not require any involved geometrical shape, or finger guards or foam pads.

SUMMARY OF THE INVENTION

The apparatus of this invention is directed to the utilization of a cover up protector, known by the acronym "CHUP". In one embodiment, a conventional lure is shaped somewhat like a small dirigible with one end simulating a fish head. Brackets are mounted on the ventral side of the lure to which a plurality of three pronged fish hooks are pivotally attached. When not in use, the shanks of these fish hooks slide into narrow slots of a plastic casing. A snap on cover is then fitted over the the end of the slot. Absent the lure a single fish hook could similarly be adapted to have a protective cover.

DETAILED DESCRIPTION OF THE INVENTION

Figure 1:
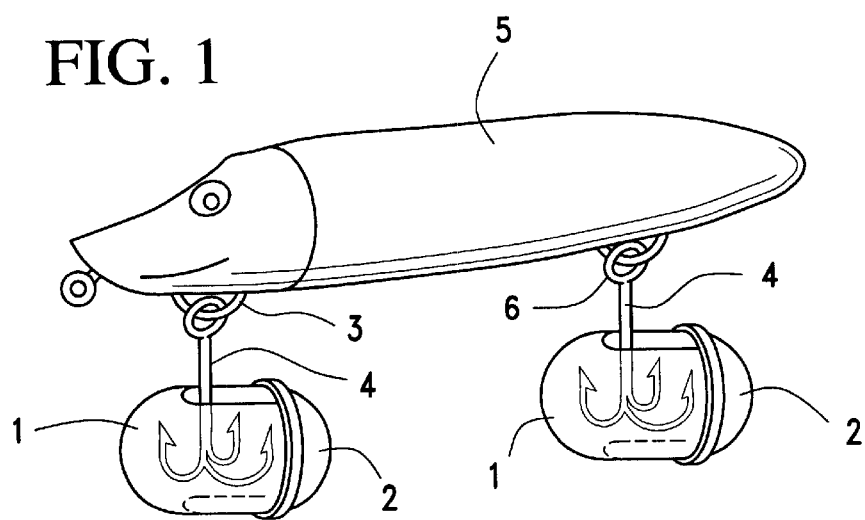
FIG. 1 is a perspective view of the lure showing a gang of hooks suspended on the lure and encased in the protective covers.
Figures 2, 2A:
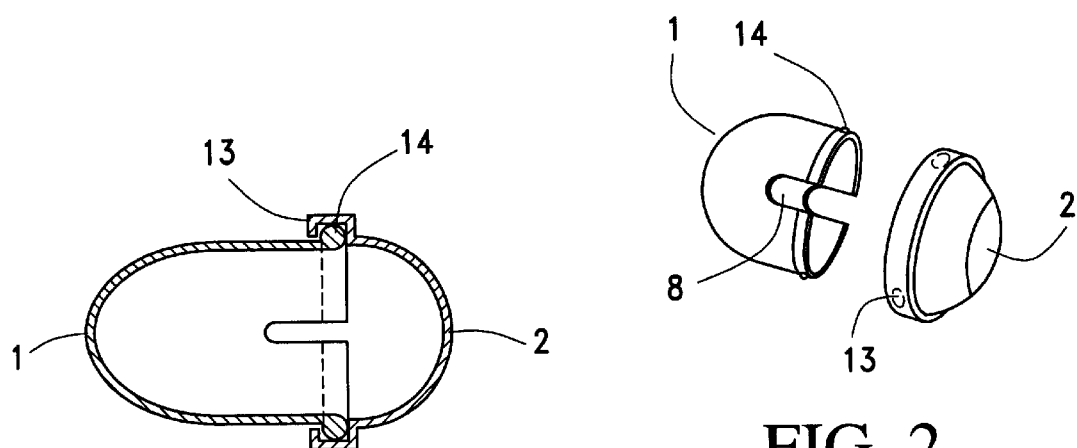
FIG. 2 is a perspective view of the casing with disassembled cover.
Figure 4:
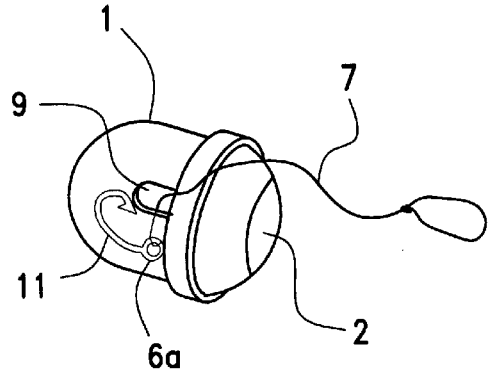
FIG. 4 shows the assembled casing enclosing a single hook to which a fishing line is attached.
Figure 3:
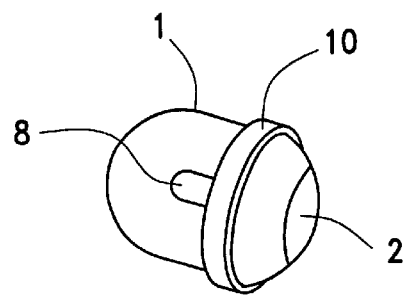
FIG. 3 is a persepctive view of the casing with assembled with the cover.

FIG. 1 shows a protective casing 1 for a fish hook with a cover 2. A bracket 3 is affixed to the ventral side of a lure 5 and the shank of a three pronged hook 4 is pivotally suspended from the bracket by an eyelet 6 the end of the shank which surrounds the bracket. The casing and cover are made of a hard plastic such as cellulose acetate or a polyester. The cover is of the snap on type. Integral with the cover is a circumferential flange 10 that facilitates removal and placement of the cover over the casing. The casing is provided with two slots 8 which extend from the end of the casing to about one third of the length of the casing as seen in FIG. 1. The slots are opposite and coincident with each other. The slots are of a width to allow the shank of the hook to readily slide through, and the casing is of a size to accommodate various size hooks. As seen in FIG. 4, absent the lure, a narrower slot 9 is used for a single pronged fishhook 11 to prevent the the shank of the hook from leaving the casing. A fishing line 7 is connected to the eyelet 6a that extends from the end of the shank of the hook. The cover of the casing can be coated with fluorescent paint to assist fishing at night. To assure that the cover will not separate from the casing, a pair of spaced projections 13 can be formed on the cover. These projections will fit over corresponding dimples 14 on the casing. To remove the cover slight pressure can be applied to the casing. The shape of the casing is generally that seen in FIG. 1, namely oval shaped, although others could be used.

In operation, the lure with the attached three pronged hooks and the assembled casing can be stored in a fishing kit or other suitable storage area. When fishing is to commence, the cover of the casing is removed, and the shank with the hooks is slid out of the casing. The hooks are baited and fishing can start. The same operation applies to other type hooks not attached to lures.

While particular embodiments of the invention has been described, it is obvious to one skilled in the art that various changes and modifications could be made without departing from the scope of the invention as shown by the following claims.

I claim:

1. A fish hook protective guard enclosing a barbed hook comprising:
   a) a casing of a size to accommodate various size hooks,
   b) said casing having an open end with two opposite and coincident slots extending from said open end to about one third the length of said casing, said slots being of a width to allow a shank of a fish hook to slide through and allow said fish hook to readily seat in said casing,
   c) a snap on cover having a circumferential flange integral therewith, said flange extending over a portion of said slots,
   d) said circumferential flange has two oppositely located projections, said projections seating over corresponding dimples adjacent said open end of said casing, said snap on cover being readily removed by applying slight pressure to said casing,
   e) said casing and said snap on cover are oval shaped.

2. A fish hook guard as in claim 1 wherein said casing and said snap on cover are made of hard plastic.

3. A fish hook guard as in claim 2, wherein said hard plastic is a cellulose acetate or a polyester.

4. A fish hook guard as in claim 1 wherein said snap on cover is coated with a fluorescent paint.

* * * * *